(12) United States Patent
Shingleton

(10) Patent No.: US 6,722,357 B2
(45) Date of Patent: Apr. 20, 2004

(54) FIXED ANGLE SOLAR COLLECTOR ARRANGEMENT

(75) Inventor: Jefferson Shingleton, Auburn, NY (US)

(73) Assignee: Powerlight Corporation, Berkeley, CA (US)

(*) Notice: Subject to any disclaimer, the term of this patent is extended or adjusted under 35 U.S.C. 154(b) by 0 days.

(21) Appl. No.: 09/929,459

(22) Filed: Aug. 15, 2001

(65) Prior Publication Data

US 2003/0034029 A1 Feb. 20, 2003

(51) Int. Cl.[7] ................................................ F24J 2/38
(52) U.S. Cl. ....................................... 126/600; 126/608
(58) Field of Search ................................ 126/600, 605, 126/606, 607, 576, 577, 608; 248/185.1, 163.1; 136/246, 248, 244

(56) References Cited

U.S. PATENT DOCUMENTS

| 4,370,974 A | * | 2/1983 | Maxey ........................ 126/621 |
| 4,644,933 A | * | 2/1987 | Gregory ...................... 126/605 |
| 4,966,631 A | | 10/1990 | Matlin et al. ................ 136/244 |
| 5,131,955 A | * | 7/1992 | Stern et al. .................. 136/245 |
| 5,228,924 A | * | 7/1993 | Barker et al. ................ 136/246 |
| 6,058,930 A | | 5/2000 | Shingleton ................... 126/600 |

FOREIGN PATENT DOCUMENTS

JP          61-39585    *  2/1986  ................. 126/600

* cited by examiner

*Primary Examiner*—James C. Yeung
(74) *Attorney, Agent, or Firm*—James F. Hann; Haynes Beffel & Wolfeld LLP (57) ABSTRACT

A solar collector array is formed of multiple parallel rows of solar panels, each said row being made of one or more building blocks with an east-west oriented torsion tube defining an east-west axis for the row, an array of flat generally rectangular solar panels, and a set of panel rails and rail claims attaching the panels onto the torsion tube. A row of piers aligned on the east-west axis each have a footing that is supported in the earth, and a pier cap affixed onto a top end of the pier. The pier cap holds the torsion tube non-rotationally such that the torsion tube and panels are held at a preset elevation angle. The torsion tube may serve as a conduit for power conductors from the panels.

17 Claims, 7 Drawing Sheets

FIXED ANGLE SOLAR COLLECTOR ARRANGEMENT

BACKGROUND OF THE INVENTION

This invention relates to solar energy collection, and in particular to an arrangement for holding a number of rows of solar panels in a generally south-facing direction at an elevation angle that is chosen for optimal exposure to the sun. The invention is more particularly directed to improvements in a rack or frame arrangement including a series of pedestals or piers, a tubular support member supported on said piers in an east-west direction, and rail frame members that support the solar panels on either side of the axis defined by the tubular support member. The invention applies to solar collectors in which the panels are arrays of photovoltaic cells for generating electrical power, but the same principles can be applied also to arrangements for solar heating, for example.

Photovoltaic arrays are used for a variety of purposes, including use as a utility interactive power system, as a power supply for a remote or unmanned site, a cellular phone switch-site power supply, or a village power supply. These arrays can have a capacity from a few kilowatts to hundreds of kilowatts or more, and can be installed wherever there is a reasonably flat, unobstructed area with exposure to the sun for significant portions of the day. There are many such flat areas available, even in rather urban areas, and an abandoned athletic field is an example of such a location.

In general terms, solar tracker systems are often used, and these systems have their photovoltaic panels arrayed in rows supported on a torque tube that serves as an axis. In a solar tracking arrangement, a tracker drive system rotates or rocks the rows to keep the panels as square to the sun as possible. In solar trackers, the rows are arranged with their axes disposed in a north-south direction, and the trackers gradually rotate the rows of panels throughout the day from an east-facing direction in the morning to a west-facing direction in the afternoon. The rows of panels are brought back to the east-facing orientation for the next day.

However, in many cases, a fixed angle system may be employed, where the solar panels are positioned at a fixed elevation angle and at a fixed azimuth. These avoid the mechanical problems and expense of a solar tracker, and may be oriented to provide sufficient electrical power at peak demand periods, which are typically at about mid-day. In a latitude that corresponds to central United States, the solar panels would be faced generally to the south, and would be pitched at an angle approximately equal to the site latitude.

Wind loads and other weather phenomena require the support rack to be of sufficient strength to carry the load forces to the foundation in which the rack is mounted.

Conventional fixed angle solar collectors are often mounted on a prism-shaped support, like a rooftop, or may be mounted on a set of axial rails supported by at least two rows of vertical supports. These types of arrangement can be difficult to align, and may be costly to install because of the large number of supports that are needed for a given number of solar panels.

One fixed angle array of solar collector panels is described in Dalacu U.S. Pat. No. 6,201,179 in which a series of interlocking corrugated support members that may be anchored to a convenient rooftop. Another fixed angle array is described in Matlin et al. U.S. Pat. No. 4,966,631, in which each row of solar panels requires a front joist or horizontal support element and rear joist or horizontal support element, which are respectively supported atop a front row and a rear row of vertical support elements. The solar panels are then attached to rails that are carried transversely on the front and rear joists. This construction requires twice as many vertical supports as if a system were employed using single row of piers with an axial torsion bar supported atop the piers. In this system the electrical bus wires are carried in the open beneath the solar panels, and additional conduits have to be provided.

OBJECTS AND SUMMARY OF THE INVENTION

Accordingly, it is an object of the present invention to provide a fixed angle solar collector arrangement that avoids the drawbacks of the prior art.

It is another object to provide a fixed-angle solar collector arrangement that accommodates stresses and wind loading.

It is a further object to provide a solar collector arrangement that employs a single row of vertical support piers for each row of solar panels, thereby facilitating ease of installation.

It is a still further object to provide a fixed angle solar collector arrangement in which the fixed elevation angle can be set by means of a pier cap that is installed on each pier, which may be at a preset angle or may be field set.

In accordance with one aspect of the present invention, a solar energy collector arrangement has a support rack associated with each row of solar panels. An east-west oriented torsion tube defines an east-west axis for the row, with an array of flat rectangular solar panels attached along opposite sides of the torsion tube. There is at least one pier having a footing supported in a foundation, a member rising thereabove, and a pier cap affixed onto a top end of said pier member, and in which said torsion tube and its attached solar panels are held at a preset elevation angle. The torsion tube has an open (hollow) cross section, and is preferably formed of sections with swaged ends that can be connected in the field by inserting a swaged end of one section into an unswaged end of the next section. The hollow torsion tube may also be used as a conduit to carry the electrical conductors from the solar panels.

Preferably, the torsion tube has a polygonal cross section, i.e., square profile, rectangular profile, or other non-round profile. The pier caps have an aperture therethrough of a similar profile, and this is oriented to define the elevation angle for the torsion tube and the row of solar panels that it supports. The torsion tube is threaded through the pier caps, and then support rails are attached at right angles, i.e., radially, on the torsion tube. The solar panels are then fastened to the support rails.

The joints between the sections of the torsion tube may be welded to form a continuous rigid support. However, it is preferred that at least some of the joints left so that the swaged end be permitted at least a limited amount of slide in respect to the unswaged end of the next section so as to allow for thermal expansion. Likewise, the torsion tube may be welded to the pier caps where the tube passes through. However, at least some of these locations can also be left unwelded to allow for motion due to thermal expansion of the torsion tube.

The solar panel array can be installed employing a relatively straightforward procedure. First a rough staking is carried out over the entire field to confirm that all the elements of the array can fit on the site. The array is formed of a units which are considered Building Blocks, and in a practical embodiment the building blocks comprise sixty solar panels disposed on the torsion tube and supported on a set of four aligned piers. Each row can comprise one Building Block, or can comprise two, three, four, or more Building Blocks. There should be sufficient clearance between the ends of each row and the perimeter of the field.

Then a more detailed stakeout of the piers is conducted over the entire field. Preferably, permanent stakes are placed on the extended lines of the rows of piers, both on the east-west axis and on the north-south axis. Each pier location is then marked with a stake. Using a laser or level, the elevation is found for each pier location, to determine grade breaks and to determine the highest and lowest piers for each row. These data are used to ensure that there will be enough ground clearance, and to determine the desired cut-off elevation for the piers. All the piers should be cut so that their top ends are at the same elevation, i.e., so that the array will be level.

The piers are then installed, preferably installing the piers at the east and west ends of each row, plus one pier in each building block, or alternatively, in every other building block. Then, these piers are cut to their final elevation, and a taut string line can be used to establish line orientation for setting the remaining piers of each row. Witness stakes are set at each reference pier location, so that the pier locations can be quickly reset after pier holes are drilled.

Each pier is to be anchored in a concrete footing in the earth. For each pier, a pier hole is to be drilled, in which the pier is placed and held plumb while concrete is poured around it. If the pier hole will not stand open before the concrete is place, a temporary liner may be used. Only a limited number of pier holes should be drilled at a time, so that the holes being drilled and piers being installed at any one time can be protected and barricaded for the period of time until the concrete has been placed.

Each pier may be in the form of a tubular member, i.e., a pier tube, which is to be positioned in the pier hole and then plumbed and aligned at the proper location. The pier tube may be set in the hole bottom to stabilize the same during concrete placement. If the hole has been over-drilled, the pier tube may he held off bottom so that the top end of the pier tube reaches the final pier cut-off elevation.

The concrete mix that is employed should have a low slump. While the pier tubes are held in place in their plumbed location against the string line(s), the concrete may be placed, and vibrated into the hole around the tube. A fixture may be employed to hold the pier tube during concrete placement. The final pier location should be verified and adjustments made as necessary. The concrete top surface should be sloped for drain with a smooth troweled finish. The concrete is permitted to cure, and then the reference piers are cut off at the final pier elevation.

The remaining piers should be installed in similar fashion, and these also are cut off at the established final pier elevation.

The pier caps are then place loosely onto the tops of the pier tubes. These are cleaned of any corrosion, and may be given a coat of a zinc-rich galvanizing paint. Then, starting from the east end of each row the torsion tubes are threaded through the pier caps. The torsion tube sections are connected by inserting the unswaged end of the western torsion tube section onto the swaged end of the eastern torsion tube section. It may be necessary to drive these members together, e.g., with a mallet and plank. As the torsion tube sections are attached, the inside edge of each swaged end should be inspected for burrs and sharp edges, which should be filed smooth, if possible, as the torsion tube will be used as an electrical conduit. The torsion tube sections may be connected continuously for two successive Building Blocks (seven sections), but at the west end of each second Building Block the joint of the swage and unswaged ends should be left loose (unwelded) to allow for thermal expansion.

After the torsion tubes are all in position, the positions are checked to ensure that the piers do not interfere with module frame rail positions. Adjustments are made as needed between the torsion tubes and pier caps. Then the joints are welded, except, as mentioned above, for the joint between every other Building Block, which is left unwelded to accommodate thermal expansion of the torsion tube. Finally, the joints of the pier caps to the pier tube and to the torsion tube are welded, being careful to ensure that the torsion tube top surface is oriented at the appropriate fixed tilt angle, i.e., elevation angle. Thereafter, all the field welds are cleaned and coated with a zinc-rich cold galvanizing paint.

Using a template or fixture, the panel rails are located onto the torsion tube and are attached using hardware provided for that purpose. The panel rails are spaced at an interval that corresponds to the width dimension (i.e., east-west dimension) of the solar panels. The solar panels, i.e., photovoltaic modules, may be attached to the panel rails, with a side rail flange of one module overlapping a side rail flange of the next module in order that they can be mounted using the same threaded fastener, using care not to over-torque the module fasteners.

The hardware for holding the panel rails onto the torsion tube includes clamp members that have a central portion fitting over the torsion tube with a mating square profile and flange members at an open side of the central square portion that fasten to the associated panel rail. The rail members are supported at their middles on the torsion tube and are held against it by their associated clamps.

In a preferred mode, the pier cap weldments have a preset fixed angle, i.e., 30 degrees, 35 degrees, etc. However, in other embodiments, the pier caps can have an adjustable elevation angle to permit field adjustment upon installation. The pier cap can have a rotatable core, and can be held at the desired angle with a set screw or by welding at installation.

As an alternative, the pier caps can comprise a portion of the pier tube or pedestal, with a receptacle for the torsion tube being cut therein, e.g., by use of a coping fixture.

The above and many other objects, features, and advantages of this invention will become apparent from the ensuing description of a preferred embodiment, which is to be read in conjunction with the accompanying Drawing.

DETAILED DESCRIPTION OF THE PREFERRED EMBODIMENT

With reference to the Drawing, and initially to FIGS. 1 to 4, a fixed angle solar collector array 10 according this invention is shown from a generally North-East aspect. In this view, a single Building Block 11 is shown, but the array can comprise rows of several Building Blocks 11 joined end to end, and can comprise any number of such rows. A torsion tube 12 serves as a generally east-west axis, and a row of solar panels 14, i.e., photovoltaic modules, is attached onto the tube 12. These are balanced with one set of panels 14 situated on each of the north and south sides of the axis. In each building block there are sixty panels or modules 14, i.e., thirty sets of two modules. There are four vertical pier tubes 16, which can be round or square cross section, as desired, each supported at a concrete footing 18 in the earth or other foundation. At a top end of each pier tube 16 is a pier cap weldment 20, which has a transverse square tubular sleeve 21 that fits the profile of the torsion tube 12. The pier caps 20 on the four pier tubes 16 are aligned so that the torsion tube 12 threads through them. There are thirty-one support rails or panel rails 22 attached onto the torsion tube 12, and are arranged across tube at right angles to the tube axis, and are spaced apart the width of one panel or module 14. Each of these panel rails 22 is favorably a channel member of square or rectangular section.

Figure 1:
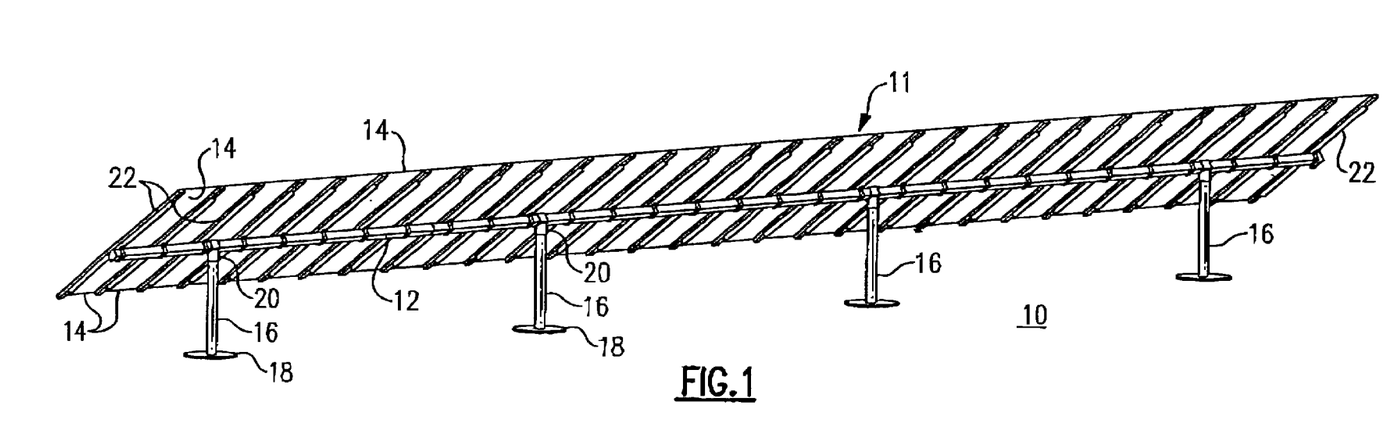
FIG. 1 is a perspective view of one Building Block of a fixed angle solar array according to an embodiment of this invention.
Figure 2:
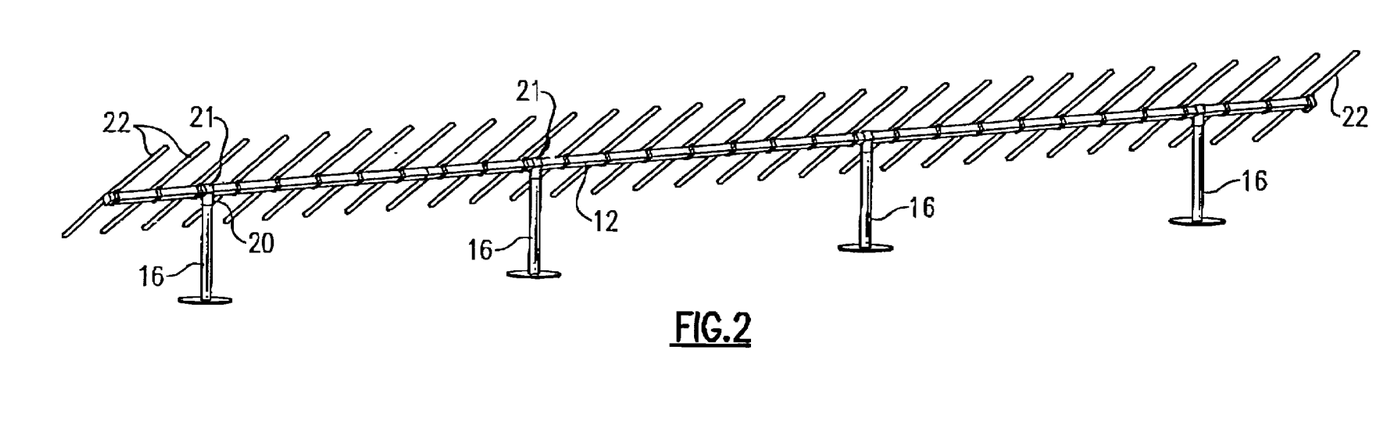
FIG. 2 is a perspective view of the supporting rack of this embodiment, before installation of the solar modules.
Figure 3:
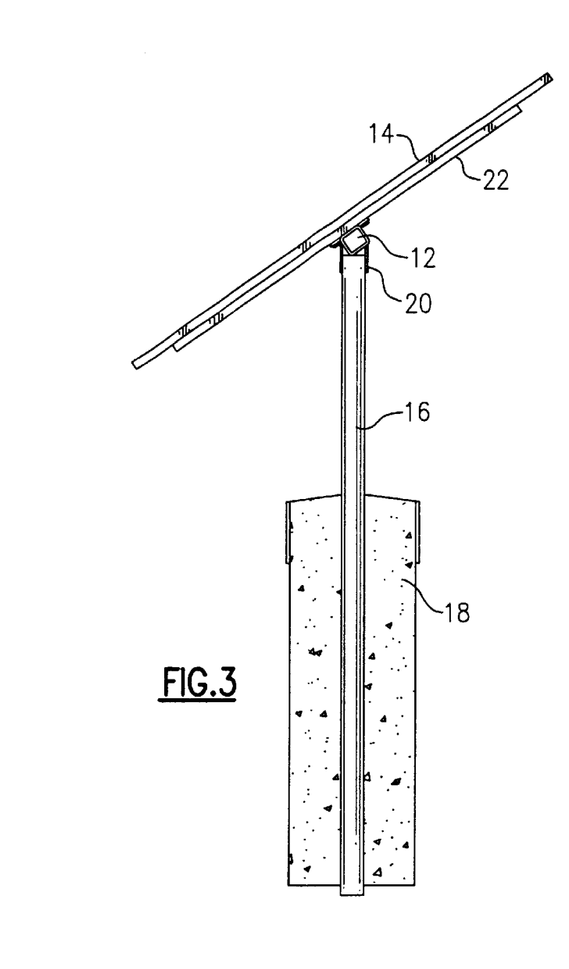
FIG. 3 is a sectional side elevation of the Building Block of this embodiment, showing the pier, torsion tube, rail, and module.
Figure 4:
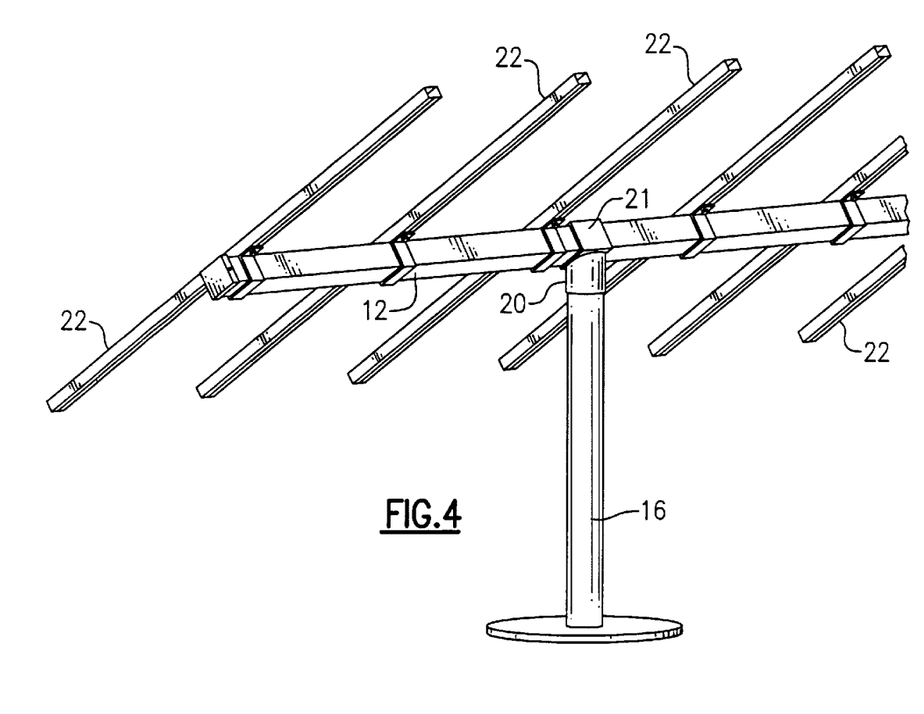
FIG. 4 is a perspective view at one end of the Building Block showing details of the pier and mounting hardware.

As shown in FIG. 3, the concrete footing 18 for the pier extends into a pier hole in the earth to support the pier tube 16. A hole liner may be employed if needed, depending upon soil conditions.

Figure 5:
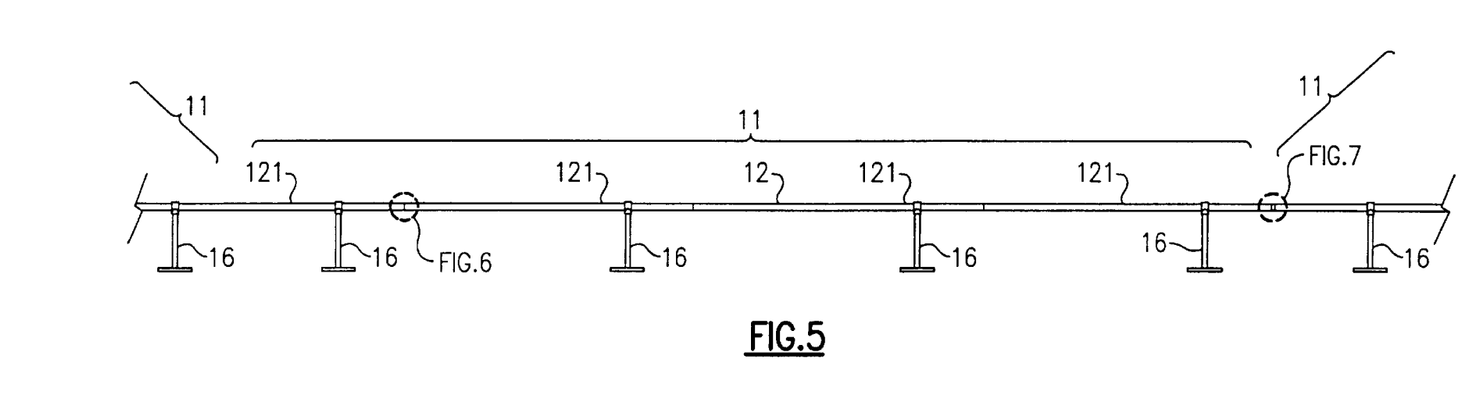
FIG. 5 is a schematic view of the torsion tube and piers of one Building Block of the array of this embodiment.
Figure 6:
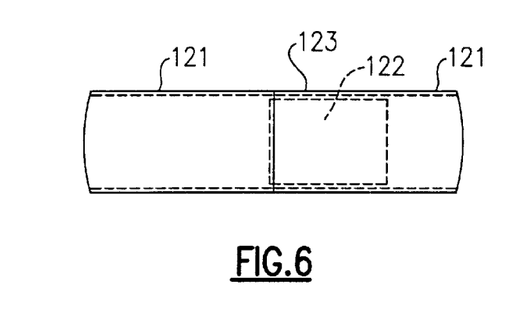
FIG. 6 is a detail view of a portion of FIG. 5.
Figure 7:
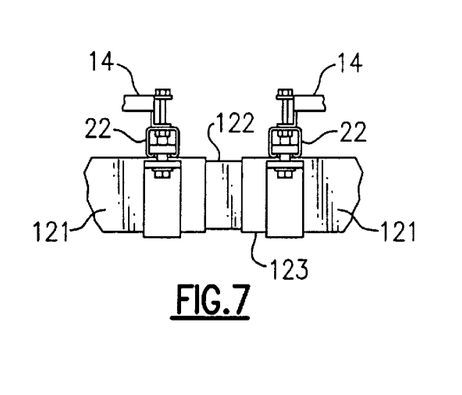
FIG. 7 is a detail view of a portion of FIG. 5.

Several of these Building Blocks 11 can be joined end to end, sharing a common torsion tube 12, as generally illustrated in FIG. 5. In this view, the modules 14 and panel rails 22 are omitted for clarity. In this embodiment, the Building Block 11 has a length of 68 feet, four inches to accommodate sixty photovoltaic modules 14. The torsion tube 12 is formed of a series of sections 121, 121, each of twenty foot length. Each section has one swaged end 122, i.e., reduced-diameter portion, with the other end 123 being unswaged (See FIG. 6). The torsion tube is constructed by fitting the unswaged end 123 of one tube section 121 over the swaged end 122 of the next successive section 121. With this system, there will be one tube section that is shared between two successive Building Blocks. However, there will be a joint between successive sections 121 falling between the end piers 16 of every other Building Block 11, as represented in FIG. 7. In this case, the joint is left with the swaged end 122 of one section is left slidably fitted into the associated unswaged end 123 of the next section, and having one or two inches of play in respect to it. In this case, the last panel 14 of the one Building Block and the first panel 14 of the next one are separated from each other at the joint, as shown in FIG. 7. As mentioned before, this permits axial sliding motion of the sections due to thermal expansion, relieving some of the stress on the torsion tube 12 and on the piers 16.

Where the torsion tube is to be used as conduit, the inside edges of the ends 122 and 123 of the sections should be made smooth to accommodate the insulated conductors used to carry the output current from the photovoltaic panels 14.

Figure 8:
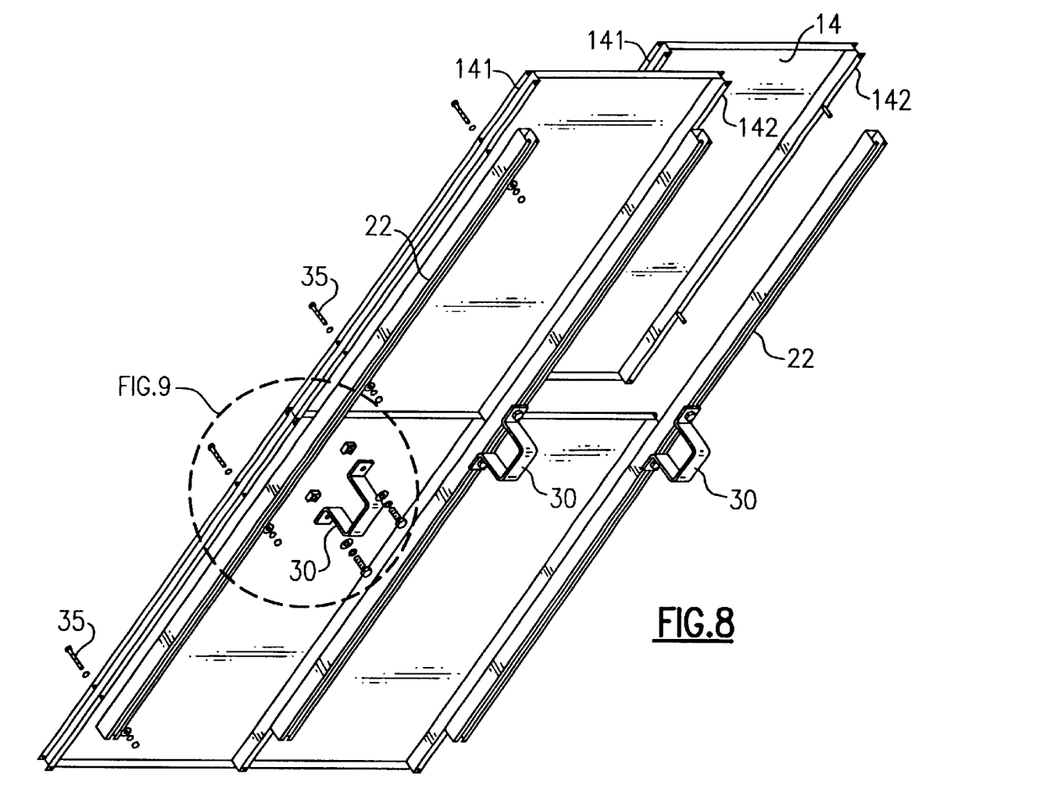
FIG. 8 is an exploded assembly view for explaining this embodiment.
Figure 9:
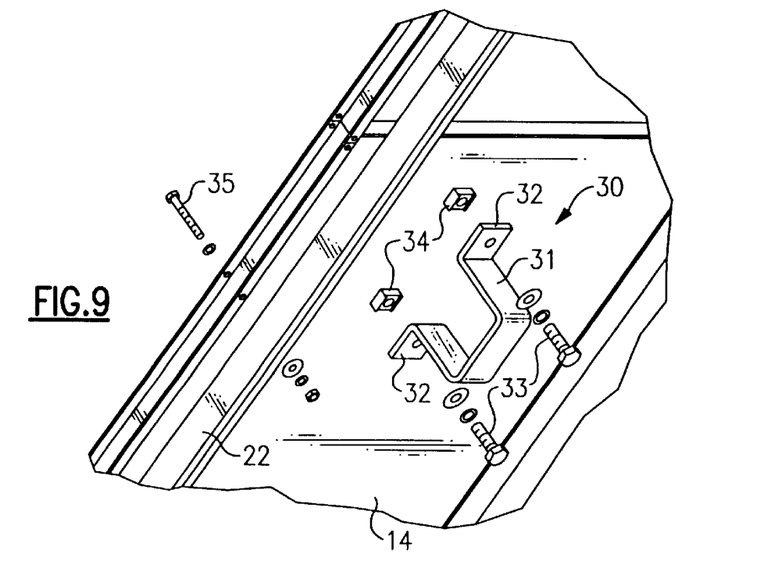
FIG. 9 is a detail view of a portion of FIG. 8.

The mounting hardware for attaching the panel rails 22 and the photovoltaic modules 14 is shown in FIGS. 8 and 9. Here, the torsion tube and pier(s) are omitted for clarity. Panel rail clamps 30 are shaped to conform with the profile of the torsion tube 12, so that they can be fastened around the torsion tube 12 and bolted into the associated panel rail 22. Here the clamp 30 has a center section 31 that is of square profile with one open side, and flanges 32 with bolt holes at either end of the center section. These are fastened at the center of the associated rail 22 using threaded bolts 33 and nuts 34. In this embodiment, the rails are channel members, and the nuts 34 may be received within a slot of the channel. Each module 14 has a module side rail 141 on one side edge, and an interleaving side rail 142 on the other side edge, so that the side rails 141 and 142 of adjacent modules 14 may be interleaved and fastened down to the one panel rail 22 using a row of threaded fasteners 35. Not shown here are gaskets and cushioning, which may be used or omitted depending upon engineering considerations.

Figure 10:
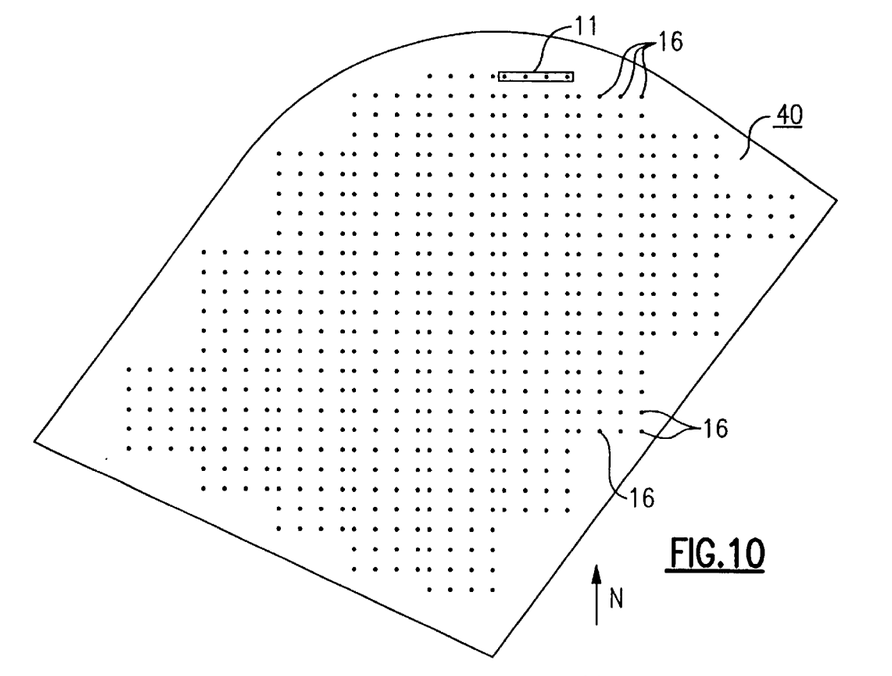
FIG. 10 is a plan view of a field showing layout of pier locations for this embodiment.
Figure 11:
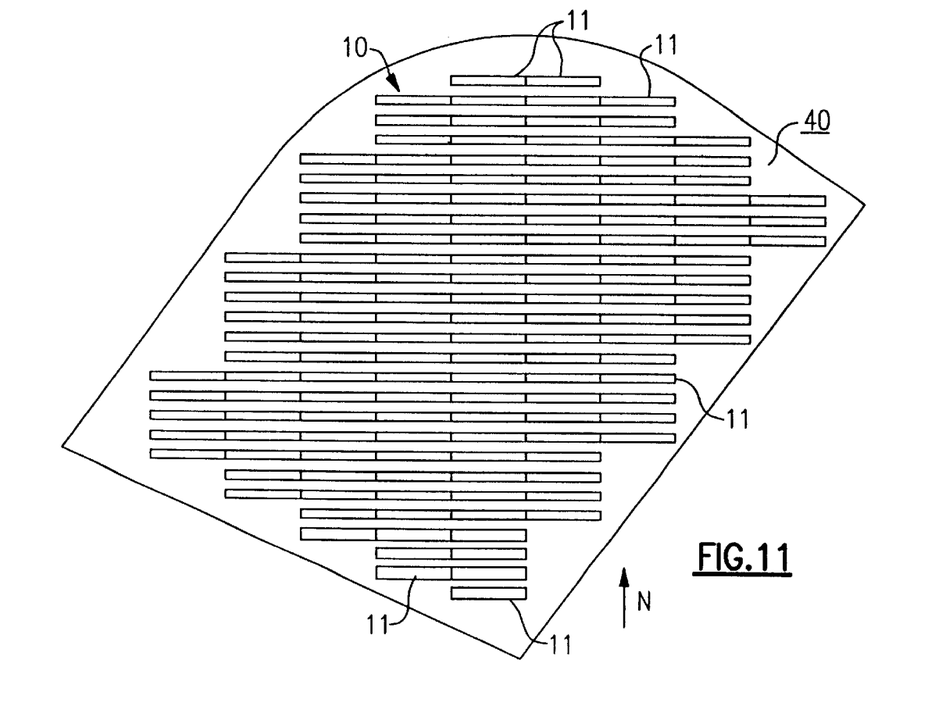
FIG. 11 is a plan view of a field showing layout of Building Blocks in accordance with this embodiment.

FIGS. 10 and 11 are plan views showing the possible arrangement of a large array 10 of a total of one-hundred forty-five (145) building blocks, each of sixty (60) modules, situated in a former baseball park 40, itself dimensioned about 500 feet north-to-south and about 650 feet east-to-west. FIG. 10 shows the locations of the piers 16, and one typical Building Block 11, while FIG. 11 illustrates the positions of all the Building Blocks 11 within the ball park 40. The array is configured in rows, with each row having one, two, three, four, five, or six Building Blocks 11. The rows can be centered at eighteen foot intervals.

In this example, the 145 Building Blocks, with sixty modules per block, have a eight-thousand, seven-hundred (8,700) modules, with an output capacity of about 43 watts per module, for a gross output power of 374 KW (direct current).

There are, of course, many other configurations which could be constructed, and which would not depart from the principles of this invention. For example, the torsion tube could be of round section, with the altitude angle being set by welding or otherwise fixing the tube in the pier caps, and the panel clamps being similarly welded onto the torsion tube. Alternatively, other non-round profiles could be employed for the torsion tube, pier caps, and panel clamps, such as hexagonal, triangular, or rectangular. Also, even with the square cross section tubing, it is possible to employ field-settable pier caps, rather than the pier caps that are shown here which have fixed, preset elevation angles. In that case, adjustment may be made in the field to the desired fixed angle. Also, the axis of the torsion tube may vary somewhat from a strictly east-west direction, to that the array face a suitable azimuth for optimal performance, depending on conditions of local peak demand.

The fundamental principles of this invention can be applied to an endless variety of sizes and types of photovoltaic and thermal modules. More or fewer modules than the sixty per Building Block, as shown as an example in this specification, could be employed without departing from the principles of the invention.

One additional arrangement for installing piers and establishing the elevation angle in the field can be explained with FIG. 12, which is comprised of FIGS. 12A, 12B, 12C, and 12D. In this arrangement, a pier height or level 42 is established, and marked, e.g., using a marker pen M, and a coping fixture 44 is fastened onto the pier tube or pedestal 16 in the field. The fixture 44 establishes an edge, or edges, that describe a cope required to fit the torsion tube 12 to the pier or pedestal, and to establish the proper elevation angle. The fixture 44 is moved from pier tube to pier tube to be used as a marking or cutting guide. Once prepared, the torsion tube 12 is simply welded in place on the coped pedestal top.

Figure 12A:
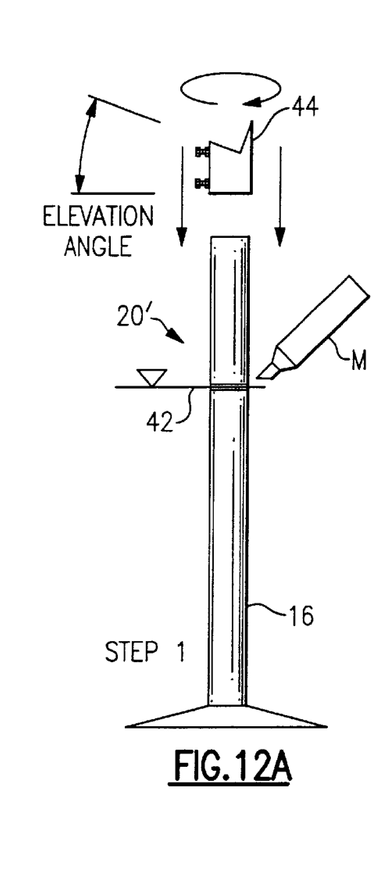
FIGS. 12A to 12D are schematic elevations for explaining one alternative embodiment.
Figure 12B:
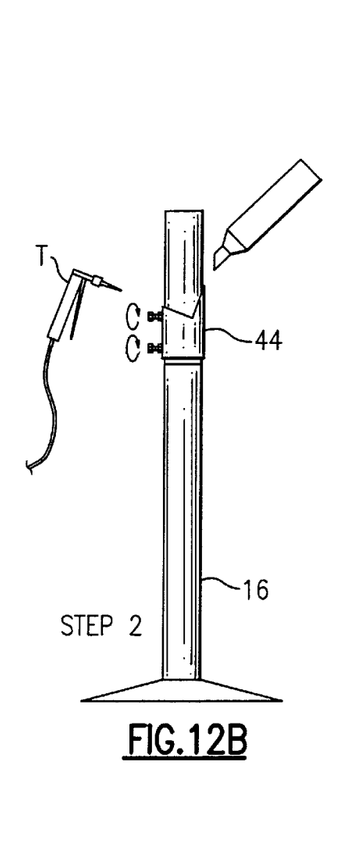
Figure 12C:
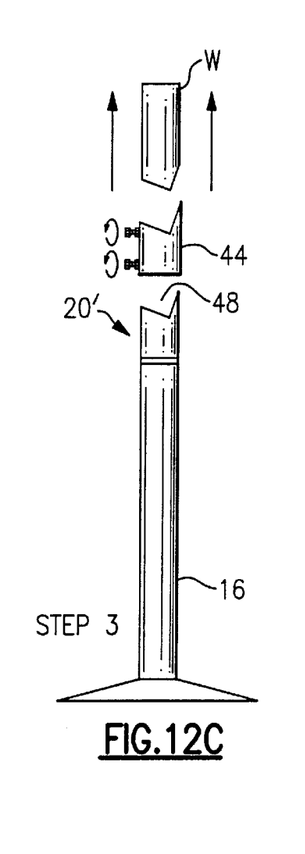
Figure 12D:
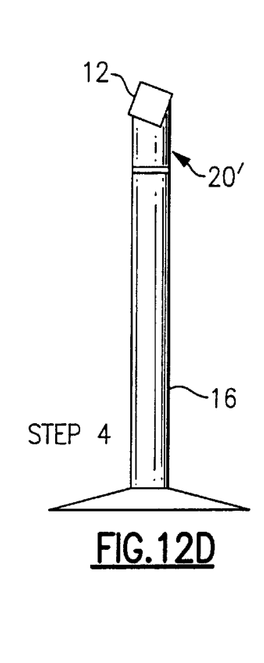

As shown in FIG. 12A, the reference elevation level 42 is first marked on the pedestals or pier tubes after the concrete cures, and then the coping fixture 44 is positioned on the pier tube and oriented. The fixture is fastened in place (FIG. 12B) and the edge lines are marked for cutting. Using a torch T or a saw, the pier material is cut at the edge line, and then the excess or waste material W and the fixture are removed (FIG. 12C). This leaves a coping 48 on the pier tube 16, so that the top end of the pier tube becomes, in effect, a pier cap 20'. The torsion tube 12 is then laid on the coping (FIG. 12D), and the torsion tube is welded to the pier tube.

Figure 13A:
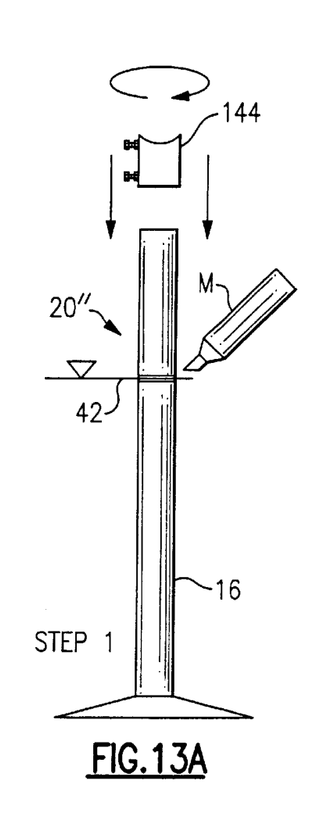
FIGS. 13A to 13E are schematic elevations for explaining another embodiment.
Figure 13B:
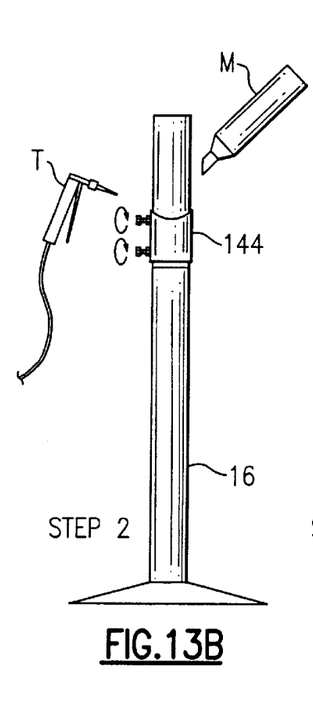
Figure 13C:
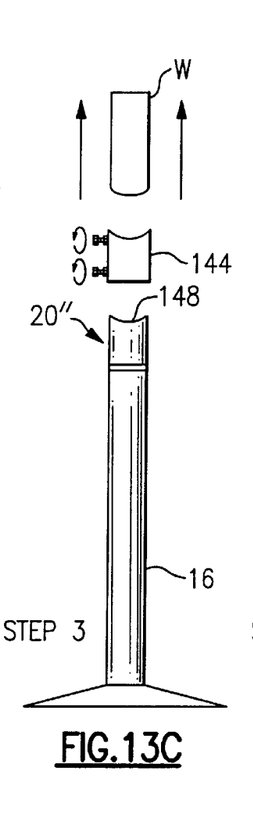
Figure 13D:
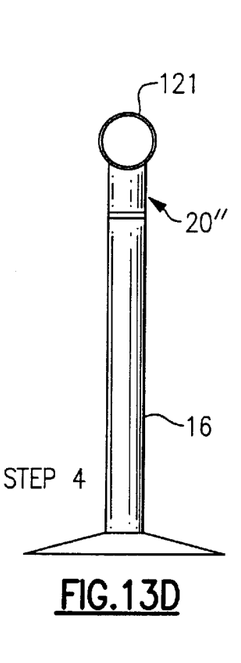
Figure 13E:
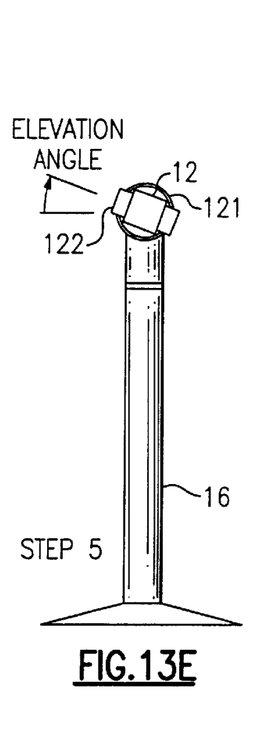

Another possible embodiment is represented in FIG. 13, which is comprised of FIGS. 13A to 13F. This embodiment employs a fixture 144 similar to that of FIG. 12, but prepares the top of the pier tube 16 to receive a round "universal" sleeve 121, whereby the sleeve 121 and the coped top of the pier serve as a pier cap 20". As in FIG. 12, the reference level 42 is first marked on the pier tubes 16, e.g., using a marker M, and the fixture 144 is oriented and installed on the tube 16, resting on the reference level 42. In this case, the fixture describes a curved edge, which is marked or scribed on the pier tube (FIG. 13B). Then using the torch T or a saw, the pedestal is cut at this edge, and the excess or waste W is taken away and the fixture 144 is removed (FIG. 13C). The pedestal sleeve 121 is positioned on the curved cut 148, and welded to the pedestal or pier tube (FIG. 13D). The welds and cuts can be coated with a zinc-rich cold galvanizing paint. The torsion tube 12 is then place through the pedestal sleeve 121, and the torsion tube is rotated to the correct elevation angle. Stabilizer fittings 122 (FIG. 13E) may optionally be employed to establish and maintain the correct elevation angle. For a round torsion tube, a sleeve interface edge can simply be welded. For a rectangular torque tube, the corners of the torsion tube may be welded to the sleeve, of the stabilizer fitting(s) 122 can be positioned and then welded both to the sleeve 121 and to the torsion tube 12.

While the invention has been described with respect to a preferred embodiment, it should be recognized that the invention is not limited to that embodiment, and that many modifications and variations are possible without departure from the scope and spirit of this invention, as defined in the appended claims.

I claim:

1. Fixed-angle solar collector arrangement comprising an east-west oriented torsion tube defining an east-west axis; an array of flat rectangular solar panels attached along opposite sides of said torsion tube; at least one pier having a footing supported in a foundation, a member rising thereabove, and a pier cap affixed onto a top end of said pier member, said torsion tube having a non-round profile and said pier cap and having an aperture therethrough of a matching profile, and in which said torsion tube and its attached solar panels are held at a preset elevation angle.

2. Fixed angle solar collector arrangement according to claim 1 wherein said torsion tube has a square cross section.

3. Fixed angle solar collector arrangement according to claim 1 further comprising a plurality of rail members extending radially outward from said torsion tube at spaced intervals along said torsion tube, wherein said solar panels are each supported between successive ones of said rail members.

4. Fixed angle solar collector arrangement according to claim 1 wherein said torsion tube is formed of two or more sections joined end to end with one of the sections having a swaged end fitting into the end of a next successive section.

5. Fixed angle solar collector arrangement according to claim 4 wherein said one section swaged end is slidably fitted into the end of the next successive section to allow for thermal expansion of said torsion tube.

6. Fixed angle solar collector arrangement comprising
an east-west oriented torsion tube defining an east-west axis;
an array of flat rectangular solar panels attached along opposite sides of said torsion tube;
at least one pier having a footing supported in a foundation, a member rising thereabove, and a pier cap affixed onto a top end of said pier member, and in which said torsion tube and its attached solar panels are held at a preset elevation angle;
a plurality of rail members extending radially outward from said torsion tube at spaced intervals along said torsion tube; and
a plurality of clamp members each attaching a respective one of said rail members onto said torsion tube, wherein said solar panels are each supported between successive ones of said rail members.

7. Fixed angle solar collector arrangement according to claim 6 wherein said torsion tube has a rectangular cross sectional profile, and said clamp members each have a portion fitting over said torsion tube and having a mating rectangular profile for holding the associated rail member non-rotatably on said torsion tube at said fixed elevational angle.

8. A solar collector arrangement comprising multiple parallel rows of solar panels, each said row including:
an east-west oriented torsion tube defining an east-west axis for said row, said torsion tube having a generally polygonal cross section;
an array of flat generally rectangular solar panels attached onto said torsion tube; and
a plurality of piers aligned on said east-west axis, each said pier having a footing that is supported in a foundation, a member rising from said footing, and a pier cap affixed onto a top end of said member, said pier caps each have an aperture for receipt of said torsion tube and having a profile matching that of said torsion tube, said torsion tube is non-rotationally supported by said pier caps such that the torsion tube and its attached solar panels are held at a preset elevational angle.

9. A solar collector arrangement according to claim 8 wherein said torsion tube is formed of two or more sections joined end to end with one of the sections having a swaged end fitting slidably into the end of a next successive one of said sections, thereby allowing for thermal expansion of said torsion tube.

10. A solar energy collection arrangement according to claim 8 wherein said torsion tube has a square profile.

11. A solar collector arrangement according to claim 8 wherein each said row includes a plurality of rail members extending at a right angle to said torsion tube at intervals therealong; and wherein said solar panels are supported between successive ones of said rail members.

12. A solar collector arrangement according to claim 11 wherein each said rail member is supported at its middle on said torsion tube.

13. A solar collector arrangement according to claim 8 wherein each row has a single torsion tube and said plurality of piers is arranged in a single row to support said single torsion tube.

14. A solar collector arrangement comprising multiple parallel rows of solar panels, each said row including:
- an east-west oriented torsion tube defining an east-west axis for said row;
- an array of flat generally rectangular solar panels attached onto said torsion tube;
- a plurality of piers aligned on said east-west axis, each said pier having a footing that is supported in a foundation, a member rising from said footing, and a pier cap affixed onto a top end of said member and in which said torsion tube is non-rotationally supported such that the torsion tube and its attached solar panels are held at a preset elevational angle;
- a plurality of rail members extending at a right angle to said torsion tube at intervals therealong; and
- a plurality of clamp members each including a central portion that fits non-rotatably over said torsion tube and flange members that fasten to an associated one of said rail members, wherein said solar panels are supported between successive ones of said rail members.

15. Fixed-angle solar collector arrangement comprising an east-west oriented torsion tube defining an east-west axis, and said torsion tube having a predetermined profile; an array of flat rectangular solar panels attached along opposite sides of said torsion tube; at least one pier having a footing supported in a foundation, a pier tube member rising thereabove, and having a coping at an upper end thereof having a profile that matches the profile of said torsion tube and in which said torsion tube is received, and in which said torsion tube and its attached solar panels are held at a preset elevation angle.

16. The fixed-angle solar collector arrangement of claim 15, in which said torsion tube has a non-round profile and said coping has a matching non-round profile.

17. Fixed-angle solar collector arrangement comprising an east-west oriented torsion tube defining an east-west axis; an array of flat rectangular solar panels attached along opposite sides of said torsion tube; at least one pier having a footing supported in a foundation, a pier tube member rising thereabove, and a pier cap at a top end of said pier member and in which said torsion tube and its attached solar panels are held at an established elevation angle, wherein said pier cap includes a sleeve in which said torsion tube is received, said sleeve having a predetermined profile, and a coping at an upper end of the pier tube and to which said sleeve is attached, said coping having a profile matching the profile of said sleeve.

* * * * *